Dec. 28, 1954     R. A. FINDLAY     2,698,321
SEPARATION PROCESS
Filed Nov. 13, 1950
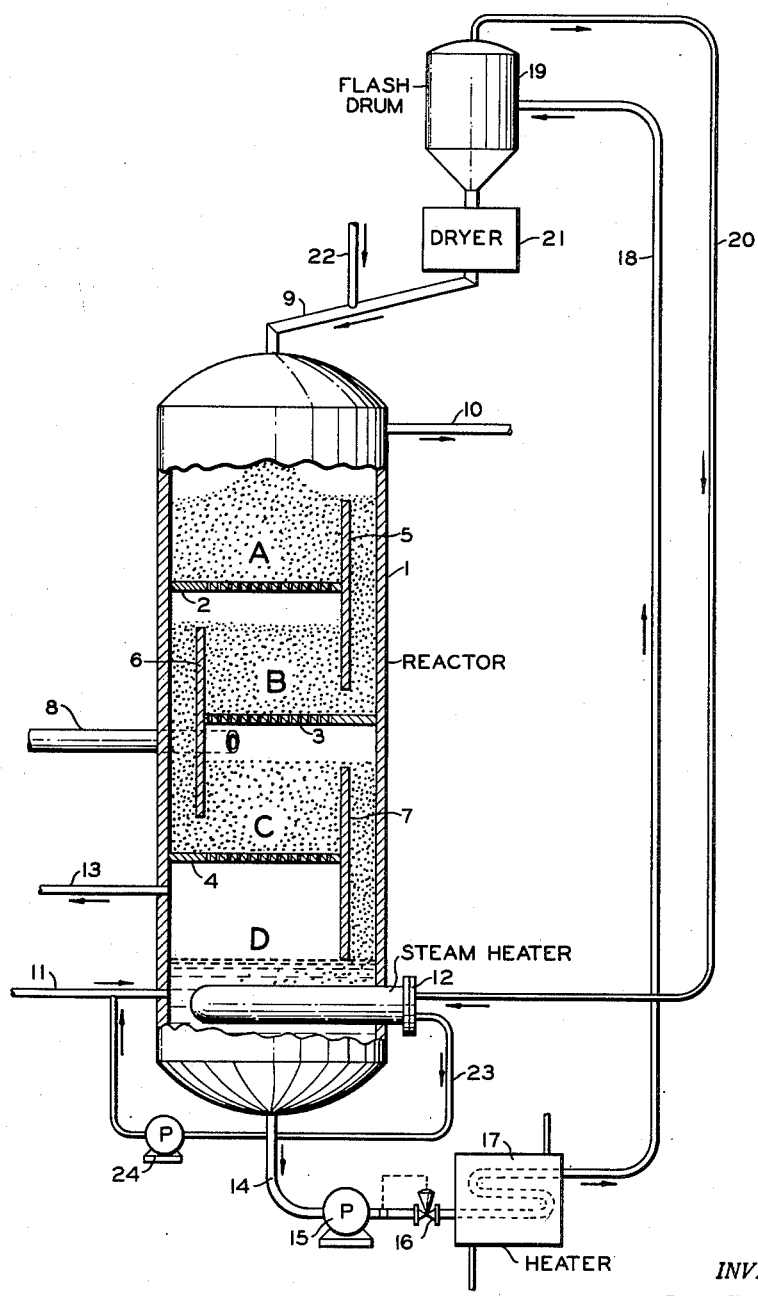
INVENTOR.
R. A. FINDLAY
BY
Hudson and Young
ATTORNEYS

United States Patent Office 2,698,321
Patented Dec. 28, 1954

2,698,321

SEPARATION PROCESS

Robert A. Findlay, Bartlesville, Okla., assignor to Phillips Petroleum Company, a corporation of Delaware Application November 13, 1950, Serial No. 195,415

9 Claims. (Cl. 260—96.5)

This invention relates to a process for the separation of organic compounds. In one of its aspects, this invention relates to a process for resolving mixtures containing an organic compound reactive with an amide selected from the group consisting of urea and thiourea and an organic compound non-reactive with the same amide. In another aspect this invention relates to a process for the separation of a class of compounds characterized by straight carbon atom chains from admixture with another class of organic compounds characterized by branched carbon atom chains by the formation of adducts, either of the former with urea or of the latter with thiourea.

There are many known processes for the separation of an organic compound from its admixture with other organic compounds. Thus, a compound having a boiling point differing substantially from another compound can be separated therefrom by means of a fractional distillation process. However, compounds having similar boiling points are difficultly separable by such a process. For example, n-octane (B. P. 125.6° C.) cannot be economically separated from 2,2,4-trimethylhexane (B. P. 125.5° C.) because of the small difference in boiling points. Such a separation is often desirable as, for example, in a gasoline manufacturing process in order to improve the octane rating of the gasoline by removal of the low octane straight-chain hydrocarbon therefrom. In another type of separation process, advantage is taken of the degree of unsaturation of the compounds being separated. For example, n-octane can be separated from 3-methyl-2-heptene by polymerization of the 3-methyl-2-heptene to form a higher boiling polymer or by its reaction with another compound, such as sulfuric acid, to form an intermediate which is then easily separable from the n-octane.

There has recently been discovered a process for the separation of organic compounds which process permits the separation of a class of compounds having one type of molecular arrangement from a class of compounds having a different molecular arrangement. Thus, straight-chain hydrocarbons can be separated, individually or as a class, from branched-chain and/or cyclic hydrocarbons independently of the boiling points of the compounds being separated. This process depends upon the peculiar property of urea ($CO(NH_2)_2$) which permits it to form adducts with organic compounds having straight carbon atom chains and yet not to form adducts with branched-chain or cyclic organic compounds. Thus, in such a process, it is possible to separate n-octane from 2,2,4-trimethylhexane, isooctane or other branched-chain hydrocarbons, irrespective of their boiling points. Also, straight-chain hydrocarbons can readily be separated from cyclic hydrocarbons, such as benzene, toluene or the cycloparaffins, irrespective of the boiling points of the various components of the mixture thereof.

While urea forms adducts with organic compounds having straight carbon atom chains, another amide, viz., thiourea ($CS(NH_2)_2$), forms adducts with organic compounds having branched carbon atom chains. Thus, the adduct-forming property of thiourea permits a ready separation of such organic compounds from organic compounds having straight carbon atom chains, since the latter do not form adducts with thiourea.

Various methods have been suggested for contacting the amide with the mixture of organic compounds to be resolved. For example, fluid processes wherein a solution of the amide is contacted either concurrently or countercurrently with the mixture of organic compounds have been suggested. Also, moving bed processes have also been suggested wherein solid amide moves countercurrent to the mixture of organic compounds to be resolved. I have noted that, when a mixture of organic compounds to be resolved is passed through a reaction column packed with urea or thiourea, the formation of the adduct tends to cement the solid phase together, and, as a consequence, plugging of the reactor results in a short period of time. My invention is directed to a solution of this problem, and it permits the use of such a method of contacting without plugging of the reactor.

It is an object of this invention to provide a process for the separation of organic compounds.

It is another object of this invention to provide a novel process for contacting a bed of solid amide selected from the group consisting of urea and thiourea with a mixture of organic compounds to be resolved thereby.

It is another object of this invention to eliminate difficulties ordinarily encountered in such a method of contacting.

It is another object of this invention to provide an improved method for the separation of organic compounds having a straight chain of carbon atoms from branched-chain and/or cyclic organic compounds by formation of adducts of the former with urea.

It is another object of this invention to provide an improved method for the separation of organic compounds having a branched or cyclic chain of carbon atoms from organic compounds having a straight chain of carbon atoms by formation of aducts of the former with thiourea.

It is a further object of this invention to eliminate difficulties encountered in the prior art in such separation processes.

Further and additional objects of this invention will be readily apparent from the disclosure and discussion hereinbelow.

I have found that, when contacting a bed of solid amide with a mixture of organic compounds to be resolved, plugging of the reactor by solid adduct can be overcome by the use of liquid-phase "fluidization." In my process the liquid mixture to be resolved is contacted with the amide at a velocity such that the amide particles are in independent random movement and a dense bed of amide particles is thus maintained.

The organic compounds that form adducts with urea are many and varied, and because of such reactivity any straight-chain organic compound capable of forming a solid adduct with urea can be separated from its admixture with any branched-chain or cyclic organic compound that does not form a solid adduct with urea. In determining whether any particular organic compound will or will not form an adduct with urea, it is necessary merely to admix such compound and urea, activated with a solvent as discussed hereinafter, with agitation and then determine whether any crystalline product or adduct has formed. Obviously, such a determination is a matter of mere routine test, and it is well within the skill of the art. However, it has been found that a straight-chain organic compound having a straight aliphatic carbon atom chain containing from six to fifty carbon atoms therein will form adducts with urea in preference to branched-chain or cyclic organic compounds. The straight-chain organic compounds can be unsubstituted hydrocarbons as well as hydrocarbons containing substituent groups, which will be discussed hereinbelow, attached to one of the two end carbon atoms of the carbon chain. Thus, one or more of such straight-chain hydrocarbons as the paraffinic hydrocarbons containing from six to fifty carbon atoms, for example, hexane, heptane, octane, nonane, decane, undecane, dodecane, tridecane, tetradecane, pentadecane, hexadecane, heptadecane, nonadecane, eicosane, heneicosane, docosane and progressively higher molecular weight straight-chain paraffins up to and including pentacontane; and the straight-chain olefins containing from six to fifty carbon atoms, for example the hexenes, heptenes, octenes, nonenes, decenes, undecenes, dodecenes, tridecenes, tetradecenes, pentadecenes, hexadecenes, heptadecenes, nonadecenes, eicosenes, heneicosenes, docosenes, and progressively higher molecular weight straight-chain olefins up to and including the pentacontenes, form adducts with urea, and accordingly, they can be readily separated from branched-chain or cyclic hydrocarbons that do not form adducts with urea. Similarly, the corresponding diolefinic hydrocarbons of the above-named compounds form adducts with urea provided the hydrocarbons contain an unbranched chain of from six to fifty carbon atoms. Additionally, many derivatives of these saturated and unsaturated hydrocarbons form adducts with urea. For example, hydroxy, amino, mercaptan, and halide derivatives of these hydrocarbons form adducts with urea. Also, various ketone and ester derivatives of these hydrocarbons react similarly. Ordinarily, the various substituent groups set forth above are attached to one of the two end carbon atoms in the unbranched carbon chain of six to fifty carbon atoms. However, when fluoride atoms are attached to the carbon chain, they act similar to hydrogen atoms, and, when attached to any of the carbon atoms in the unbranched chain, they do not inhibit the formation of adducts with urea. The primary characteristic of these organic compounds is the unbranched chain of from six to fifty carbon atoms.

On the other hand, organic compounds containing a branched chain of carbon atoms form adducts with thiourea, and in accordance with this property they are readily separable from organic compounds containing a straight chain of carbon atoms. Thus, with thiourea branched chain hydrocarbons containing from three to fifty carbon atoms in the straight carbon atom chain portion of the molecule and also having one or more alkyl substituents therein ranging from one to twenty carbon atoms in length, for example, methyl propane, the methyl butanes, dimethyl butane, the methyl pentanes, the ethyl pentanes, trimethyl pentane, diethyl pentane, the methyl hexanes, di-, tri-, and tetramethyl hexane, the ethyl hexanes, di-, tri-, and tetraethyl hexane, ethyl heptane and other alkyl paraffins as well as methyl propene, the methyl butenes, di-, tri-, and tetramethyl butenes, the methyl pentenes, the ethyl pentenes, trimethyl pentenes, diethyl pentene and other branched-chain olefins including higher molecular weight olefins, for example, methyl, ethyl, propyl and butyl derivatives of hexadecene, docosene and pentacontene, will form adducts with thiourea. Also, the corresponding branched chain diolefinic hydrocarbons react similarly. Furthermore, these branched chain compounds may have attached either to the straight chain or the branched chain of carbon atoms anyone of the substituent groups set forth above in the discussion of compounds that form adducts with urea. The primary characteristic of these compounds is the branched chain of carbon atoms.

Various alicyclic-type organic compounds form adducts with thiourea. For example, cycloparaffins, such as cyclopentane, cyclohexane, methylcyclopentane, methylcyclohexane, di- and trimethylcyclopentane, and the like, and the corresponding unsaturated hydrocarbons form adducts with thiourea. Also, menthane has been found to form such adducts with thiourea, as well as oxygenated derivatives of terpenes, such as camphor, borneol, fenchone, and the like. It is within the scope of my invention to separate mixtures of organic compounds containing any of the compounds described above, and it is also within the scope of my invention to decompose adducts of the above-described organic compounds and either urea or thiourea.

The urea adducts that are formed in accordance with my invention contain more than three mols of urea per mol of organic compound, and the thiourea adducts contain more than two mols of thiourea per mol of organic compound.

The adducts of the amide and the organic compounds disclosed above are formed at a temperature below the decomposition temperature of the adducts. In general, this temperature is below 175° F., and room temperature, say 60 to 80° F., is preferred. From 2 to 100 mols of amide per mol of organic compound are employed, and the amide is introduced to the reaction in the solid state. Although a solvent for the amide is not always essential in my process, it is preferred to employ a sufficient amount of solvent to at least wet the amide without forming a separate, filterable, liquid phase. Ordinarily, the amide contains no more than 15 weight per cent of the solvent, and usually from 5 to 10 weight per cent is sufficient. Suitable solvents, which may also be termed activators or catalysts, are water, methanol, ethanol, propanol, secondary butyl alcohol and various ketones. Also, the nitrogen-containing compounds disclosed in the copending application of Ackerman, Serial No. 155,134, filed April 10, 1950, can be employed as solvents or activators.

I will describe my invention in further detail with reference to the use of urea wetted with 7 weight per cent water to resolve a mixture of straight-chain and branched-chain paraffins, but it will be obvious from the above discussion that my invention is also applicable to the use of thiourea, that solvents other than water can be employed, and that mixtures of other organic compounds can be similarly resolved. In my process the mixture to be resolved is passed through the bed of urea wetted with water at a velocity sufficient to fluidize the urea and adducts formed during the adduct-forming reaction. The linear velocity of the mixture is sufficient to place the solid particles in a turbulent, random movement but insufficient to carry the solids from the top of the reactor or column employed. The solid adducts formed during the adduct-forming reaction can be fluidized at lower velocities of liquid through a bed than the solid urea. For example, an adduct of n-hexadecane and urea can be fluidized with liquid isooctane at velocities of 0.6 to 1.0 feet per minute of the isooctane; solid urea requires higher linear velocities of isooctane for fluidization, say from 2.2 to 3.2 feet per minute. In practicing my invention the linear velocity of the mixture to be resolved through the bed of solid urea and adduct is within the range of 0.5 to 3.0 feet per minute. The particle size of the urea for my process is such that the solid urea is readily fluidizable. In general, the particle size is within the range of 60 to 400 mesh, and it is preferred that the particles be retained by a 120 mesh screen or filter.

Although my process can be effected in a single reaction zone with a single fluidized bed of urea, I prefer to carry out the process with a series of two or more superimposed and connecting beds of solids in a single reaction column. This preferred method will be shown and discussed in greater detail hereinbelow with reference to the accompanying drawing.

After formation of the adducts in my process, it is necessary to decompose the adducts to regenerate the amide and the organic compounds therefrom. This can be accomplished by such methods as dry heating of the adduct, contacting the adduct with solvent for the amide or for the organic compounds in the adduct with the amide, or other suitable methods. In my process I prefer to decompose the adducts in a separate zone in the same reaction column wherein the adducts are formed. The decomposition is usually effected at temperatures within the range of 60 to 270° F. The actual decomposition temperature is dependent upon the organic compound in the adduct with the amide since the thermal stability of the adduct depends upon the number of carbon atoms in the organic compound forming the adduct with the amide. Also, when the adducts are decomposed in the presence of a solvent for urea, the actual decomposition temperature employed is dependent upon the urea solvent that is used. In any event, the temperature employed to regenerate the amide and organic compound from the adduct is within the range of 60 to 270° F. in most instances.

The accompanying drawing is an elevation view, partly cut away, of a system for practicing a preferred embodiment of my invention. This drawing does not include conventional equipment, such as temperature and pressure control controllers, flow controllers, and the like, but the inclusion of such equipment is within the scope of my invention.

Referring now to the accompanying drawing, reactor 1 is subdivided into zones A, B, C, and D by the use of horizontal, porous plates 2, 3 and 4. These plates are sufficiently porous to permit the upward passage of liquids, but solid urea and adducts do not pass downwardly through the plates. Attached to plates 2, 3 and 4 are solid vertical baffles or plates 5, 6 and 7, respectively, which, with the inner surface of reactor 1, form downcomers connecting the various zones of reactor 1. This method of construction of reactor 1 permits the passage of solid adducts and any accompanying solid urea downwardly through the reactor via the aforesaid downcomers. A hydrocarbon mixture of straight-chain and branched-chain hydrocarbons, say n-hexadecane and isooctane, is introduced to reactor 1 via line 8 at a rate such that the linear velocity of the hydrocarbons through the reactor is within the range of 0.5 to 3.0 feet per minute. Urea containing 7 weight per cent water enters reactor 1 via line 9 and a fluidized bed of urea and adduct of urea and n-hexadecane is formed in zone A. The adduct has a fluffy appearance and it is less dense than the solid urea. Consequently, most of the unreacted urea tends to remain in zone A, and the adduct and some solid urea are removed therefrom via the downcomer. Solid urea and adduct enter the downcomer connecting zones A and B and thus pass to zone B where additional urea and n-hexadecane react to form solid adduct. As a result of the adduct formation in reactor 1 the hydrocarbon product stream removed from reactor 1 via line 10 is rich in isooctane and its content of n-hexadecane is considerably lower than the feed stream entering the system via line 8. If the product stream passing via line 10 is not sufficiently low in n-hexadecane, a portion or all of that stream can be recycled to the reactor via line 8 for further purification. Alternatively, reactor 1 can be provided with more than two reaction zones in order to remove additional amounts of n-hexadecane from the hydrocarbon feed.

From zone B of urea and n-hexadecane and any unreacted urea pass to zone C via the downcomer connecting the two zones, and in zone C the adduct is contacted and thus washed with n-hexadecane from adduct decomposition, as described hereinbelow. As a result of this washing isooctane occluded on the adduct particles is removed therefrom and passes upwardly into zone B. The solids in zone C are also maintained in a fluidized bed, and washed adduct with occluded n-hexadecane passes from zone C to zone D via the connecting downcomer. Water enters zone D via line 11, and zone D is provided with a steam heater 12 for heating the water and adduct to a temperature sufficiently high to decompose the adduct. Consequently, the adduct is decomposed to regenerate urea and n-hexadecane. The urea is dissolved in the water, and this aqueous phase separates from the n-hexadecane in the lower portion of zone D. The hydrocarbon phase, or n-hexadecane, stratifies above the aqueous phase, and a portion thereof is withdrawn from the reactor via line 13 as a product of the process. A second portion of the n-hexadecane passes upwardly into zone C where it serves to wash occluded isooctane from the adduct in that zone.

Aqueous solution of urea is withdrawn from reactor 1 via line 14, pump 15 and valve 16 to steam heater 17 and thence via line 18 to flash drum 19. In drum 19 water in the form of steam is flashed off and passed via line 20 to steam heater 12 where it serves to provide heat for decomposing adduct in zone D. In steam heater 12 steam entering via line 20 is condensed to form water which is withdrawn therefrom via line 23 and pump 24 and thence returned to zone D via line 11 where it serves to decompose additional adduct and thus regenerate urea and n-hexadecane. Urea passes from drum 19 to dryer 21 where additional water is removed from the urea, and the resulting solid urea wetted with about 7 weight per cent water is returned to reactor 1 via line 9. Make-up urea is added to the system via line 22.

Since the adduct-forming reaction is exothermic, it may be necessary to provide zones A and B with means for removing excess heat of reaction. For example, zones A and B can be water-jacketed or cooling coils can be provided in the reaction zones. Also, it may be desirable to provide line 9 with cooling means in order to cool the urea entering reactor 1.

From the above description of my process it is obvious that zones A and B are adduct-forming zones. In zone C adduct thus formed is washed, and in zone D the washed adduct is decomposed. Various modifications of my process within the scope of my invention will be apparent to those skilled in the art. For example, it is within the scope of my invention to decompose adduct formed in reactor 1 in a zone separate from that reactor. For example, instead of providing reactor 1 with zone D, adduct and hydrocarbon passing via the downcomer connecting zones C and D can be passed to a zone outside reactor 1 where the hydrocarbon and adduct are heated to a temperature sufficient to decompose the adduct. Subsequently, hydrocarbon is separated from the regenerated urea. Any portion of the hydrocarbon that is required to wash the adduct in zone C of reactor 1 is recycled to that zone, and regenerated urea is recycled to zone A of reactor 1 as required.

It is also within the scope of my invention to employ two or more filter presses in place of filter 21. Then, while adduct is being decomposed in and urea is being removed from one filter press, the slurry stream passing via line 20 is passed to a second filter press to remove adduct from the slurry. It is also within the scope of my invention to employ two or more reaction zones in place of reactor 13. From the above discussion numerous modifications and advantages of my process will be apparent to those skilled in the art.

I claim:

1. In a method for resolving a liquid mixture of organic compounds, wherein one of said compounds is reactive with an amide selected from the group consisting of urea and thiourea to form a solid adduct therewith, by contacting said mixture with said amide, the improvement which comprises passing said mixture upwardly through a bed of said amide; controlling the velocity of said mixture through said bed within the range of 0.5 to 3 feet per minute so as to maintain the solid particles of amide in a state of independent random motion and to carry less dense solid adduct upwardly through said bed; and removing solid adduct from the top portion of said bed.

2. The method for resolving a liquid hydrocarbon mixture wherein one hydrocarbon is reactive with an amide selected from the group consisting of urea and thiourea to form a solid adduct therewith and wherein a second hydrocarbon is non-reactive with said amide which comprises passing said hydrocarbon mixture upwardly through a bed of said amide; controlling the velocity of said hydrocarbon mixture through said bed within the range of 0.5 to 3 feet per minute so as to maintain the solid particles of amide in a state of independent random motion and to carry less dense solid adduct upwardly through said bed; and removing solid adduct from the top portion of said bed.

3. The method of resolving a liquid mixture containing a straight-chain paraffinic hydrocarbon reactive with urea and a branched-chain paraffinic hydrocarbon non-reactive with urea which comprises passing said hydrocarbon mixture upwardly through a bed of solid urea; controlling the velocity of said hydrocarbon mixture through said bed within the range of 0.5 to 3 feet per minute so as to maintain the solid particles of amide in a state of independent random motion and to carry less dense solid adduct upwardly through said bed; recovering solid adduct from the top of said bed; and withdrawing from said bed hydrocarbon containing less straight-chain paraffinic hydrocarbon than said original hydrocarbon mixture.

4. A process according to claim 3 wherein the hydrocarbon mixture and urea are contacted at a temperature not above 175° F.

5. The method of resolving a liquid mixture containing a straight-chain paraffinic hydrocarbon reactive with urea and a branched-chain paraffinic hydrocarbon non-reactive with urea which comprises introducing solid particles of urea to an upper portion of a reaction zone and introducing said liquid hydrocarbon mixture to a lower portion of a reaction zone wherein the flow of said hydrocarbon mixture and solid particles is generally counter-current, controlling the velocity of said mixture so that the urea particles are in a fluidized condition in said reaction zone, removing solid adduct of urea and straight-chain paraffinic hydrocarbon from a lower portion of said reaction zone and branched-chain hydrocarbon from an upper portion of said reaction zone, the fluidized solid particles in said reaction zone being maintained in a plurality of spaced beds arranged one above the other with a connecting confined vertical passageway between the beds so that hydrocarbon mixture flows upwardly through the beds to fluidize the solid particles therein and fluidized solid particles richer in fluffy adduct particles flow from a predetermined level of an upper bed to a lower bed through the vertical passageway.

6. The method of resolving a mixture containing a straight-chain paraffinic hydrocarbon reactive with urea and a branched-chain paraffinic hydrocarbon non-reactive with urea which comprises contacting said mixture in a reaction zone with solid urea containing no more than 15 weight per cent water at a temperature not above 175° F. to form solid adduct of urea and said straight-chain hydrocarbon, the solid urea and adduct in said reaction zone being maintained in at least three spaced beds one above the other with a connecting confined vertical passageway between the beds so that liquid in said reaction zone flows upwardly through the beds to fluidize solid particles therein and fluidized solid particles richer in fluffy adduct particles flow from a predetermined level of an upper bed to a lower bed through the vertical passageway; introducing said solid urea to the top of said reaction zone; introducing said mixture to be resolved to said reaction zone at a point intermediate the second and third lowest of said spaced beds in such a manner that the velocity of said mixture through said reaction zone is such that solid particles therein are in a fluidized condition and within the range of 0.5 to 3 feet per minute; in said lowest bed contacting solid adduct therein with straight-chain hydrocarbon passing upwardly from below the lowest bed to wash occuded branched-chain hydrocarbon from said adduct; below said lowest bed contacting said adduct of urea and straight-chain hydrocarbon with water at a temperature not lower than the decomposition temperature of said adduct; withdrawing from below said lowest bed straight-chain paraffinic hydrocarbon and an aqueous solution of urea; and withdrawing from said reaction zone at a point above the uppermost bed therein branched-chain paraffinic hydrocarbon.

7. A method according to claim 6 wherein the urea and mixture to be resolved are contacted at a temperature within the range of 60 to 80° F.

8. A method according to claim 6 wherein the adduct of urea and straight-chain paraffinic hydrocarbon and water are contacted at a temperature within the range of 60 to 270° F. and not below the temperature at which the adduct decomposes.

9. A method according to claim 6 wherein the straight-chain paraffinic hydrocarbon is n-hexadecane and the branched-chain paraffinic hydrocarbon is isooctane.

References Cited in the file of this patent

UNITED STATES PATENTS

| Number | Name | Date |
|---|---|---|
| 2,386,734 | Wolk | Oct. 9, 1945 |
| 2,444,990 | Hemminger | July 13, 1948 |
| 2,446,076 | Campbell et al. | July 27, 1948 |
| 2,455,419 | Johnson | Dec. 7, 1948 |
| 2,499,820 | Fetterly | Mar. 7, 1950 |
| 2,557,202 | Lien et al. | Dec. 4, 1951 |

OTHER REFERENCES

Simpson, "Oil and Gas Journal," May 12, 1945.
Australian application No. 17339/47, available February 12, 1948.